United States Patent
Schaefer et al.

(10) Patent No.: US 10,692,624 B2
(45) Date of Patent: Jun. 23, 2020

(54) CONDUCTIVE THERMOPLASTIC POLYURETHANE

(71) Applicant: BASF SE, Ludwigshafen (DE)

(72) Inventors: Frank Schaefer, Stemwede (DE); Ernst Minder, Sissach (CH); Dirk Kempfert, Stemwede-Dielingen (DE); Christoph Bahr, Lembruch (DE); Cornelia Hinrichs, Diepholz (DE); Anja Oltmanns, Melle (DE)

(73) Assignee: BASF SE, Lugwigshafen (DE)

( * ) Notice: Subject to any disclaimer, the term of this patent is extended or adjusted under 35 U.S.C. 154(b) by 73 days.

(21) Appl. No.: 15/029,967

(22) PCT Filed: Oct. 14, 2014

(86) PCT No.: PCT/EP2014/071985
§ 371 (c)(1),
(2) Date: Apr. 15, 2016

(87) PCT Pub. No.: WO2015/055631
PCT Pub. Date: Apr. 23, 2015

(65) Prior Publication Data
US 2016/0260516 A1    Sep. 8, 2016

(30) Foreign Application Priority Data

Oct. 15, 2013 (EP) .................... 13188767

(51) Int. Cl.
| | | |
|---|---|---|
| *H01B 1/20* | (2006.01) | |
| *C08K 5/41* | (2006.01) | |
| *C08L 23/12* | (2006.01) | |
| *C08L 25/06* | (2006.01) | |
| *C08G 18/48* | (2006.01) | |
| *C08L 59/02* | (2006.01) | |
| *C08L 27/06* | (2006.01) | |
| *C08G 18/73* | (2006.01) | |
| *C08G 18/32* | (2006.01) | |
| *H01B 1/12* | (2006.01) | |
| *C08L 23/06* | (2006.01) | |
| *C08G 18/66* | (2006.01) | |
| *C08K 5/00* | (2006.01) | |
| *C08K 5/3445* | (2006.01) | |
| *C08L 75/08* | (2006.01) | |
| *C08G 18/20* | (2006.01) | |

(52) U.S. Cl.
CPC .......... *H01B 1/20* (2013.01); *C08G 18/2027* (2013.01); *C08G 18/3206* (2013.01); *C08G 18/4808* (2013.01); *C08G 18/4837* (2013.01); *C08G 18/4845* (2013.01); *C08G 18/4854* (2013.01); *C08G 18/6674* (2013.01); *C08G 18/73* (2013.01); *C08K 5/0075* (2013.01); *C08K 5/3445* (2013.01); *C08K 5/41* (2013.01); *C08L 23/06* (2013.01); *C08L 23/12* (2013.01); *C08L 25/06* (2013.01); *C08L 27/06* (2013.01); *C08L 59/02* (2013.01); *C08L 75/08* (2013.01); *H01B 1/122* (2013.01); *C08K 2201/017* (2013.01)

(58) Field of Classification Search
None
See application file for complete search history.

(56) References Cited

U.S. PATENT DOCUMENTS

| | | | | |
|---|---|---|---|---|
| 4,814,412 A | * | 3/1989 | Crowther ............. | B01D 63/061 427/393.5 |
| 6,149,840 A | * | 11/2000 | Ardakani ............... | C08G 61/02 252/500 |
| 6,632,866 B2 | * | 10/2003 | Kaufhold ........... | C08G 18/4854 524/394 |
| 2003/0166794 A1 | * | 9/2003 | Muehlfeld ........... | C08G 18/664 525/453 |
| 2003/0181568 A1 | * | 9/2003 | Amarasekera ........... | H01B 1/24 524/495 |
| 2004/0171767 A1 | * | 9/2004 | Pohlmann .......... | C08G 18/0895 525/453 |
| 2009/0069526 A1 | * | 3/2009 | Henze ...................... | A43B 1/14 528/65 |
| 2010/0056646 A1 | | 3/2010 | Shalaby et al. | |
| 2010/0261002 A1 | * | 10/2010 | Tajima ............... | C08G 18/6216 428/323 |

(Continued)

FOREIGN PATENT DOCUMENTS

| | | |
|---|---|---|
| EP | 2 227 391 | 9/1984 |
| EP | 0 613 919 A1 | 9/1994 |

(Continued)

OTHER PUBLICATIONS

International Search Report dated Feb. 12, 2015 in PCT/EP2014/071985.
H. Zweifel, "Plastics Additive Handbook" Hanser Publishers, 2001, pp. 98-136.

* cited by examiner

Primary Examiner — Katie L. Hammer
(74) Attorney, Agent, or Firm — Oblon, McClelland, Maier & Neustadt, L.L.P.

(57) ABSTRACT

The invention relates to a composition comprising a thermoplastic polyurethane, where the thermoplastic polyurethane has been prepared from a) a diisocyanate, b) a polyol comprising a polyol A and a polyol B and c) a chain extender, optionally with the aid of catalysts and optionally further comprising additives and/or auxiliaries, and a salt and/or an ionic liquid, preferably an ionic liquid, is comprised in the composition and the polyol A comprises ethoxy and propoxy groups and the polyol B comprises butoxy groups.

16 Claims, No Drawings

(56) References Cited

U.S. PATENT DOCUMENTS

| | | | | |
|---|---|---|---|---|
| 2011/0031442 A1* | 2/2011 | Suh | ............... | C08G 18/4833 |
| | | | | 252/500 |
| 2011/0306724 A1* | 12/2011 | Campbell | .......... | C08G 18/0823 |
| | | | | 524/591 |
| 2013/0214211 A1* | 8/2013 | Lehmann | ................ | C08K 5/17 |
| | | | | 252/506 |
| 2014/0031478 A1* | 1/2014 | Lu | ..................... | C08G 18/4277 |
| | | | | 524/425 |

FOREIGN PATENT DOCUMENTS

| | | |
|---|---|---|
| EP | 0 964 013 A1 | 12/1999 |
| EP | 1 213 307 A1 | 6/2002 |
| EP | 0 829 520 B1 | 10/2004 |
| EP | 1 846 465 | 10/2007 |
| EP | 1 984 438 | 10/2008 |
| EP | 2 170 972 | 4/2010 |
| EP | 2 500 376 A1 | 9/2012 |
| JP | 2001-114859 A | 4/2001 |
| JP | 2001-354748 A | 12/2001 |
| WO | WO 2006/082183 A1 | 8/2006 |
| WO | WO 2007/090755 A1 | 8/2007 |
| WO | WO 2009/010502 A1 | 1/2009 |
| WO | WO 2009/086246 A1 | 7/2009 |
| WO | WO 2011/069960 A1 | 6/2011 |

CONDUCTIVE THERMOPLASTIC POLYURETHANE

The present invention relates to a composition comprising thermoplastic polyurethane and a salt and/or an ionic liquid which can be used for increasing the conductivity in polymers.

PRIOR ART

It is known that polymers are subjected to strong electrostatic charging and charges once applied can be conducted away only slowly because of the low electrical conductivity of polymers.

Particles are attracted from the surroundings by the electrostatic charge, as a result of which accelerated soiling of such surfaces can occur. Apart from the purely esthetic impairment of these materials, the electrostatic charging of polymers can also result in adhesion of polymer materials to one another. Mention may here be made by way of example of clumping of polymer powders or adhesion of films, which frequently lead to difficulties in production. The consequences of electrostatically charged polymers is likewise problematical in the production of electronic components, since these can be destroyed at excessively high currents.

Finally, the electrostatic charge of the polymers can be discharged to people or into the environment, as a result of which sparking occurs. This has frequently already led to serious explosions, especially where explosive mixtures are being stored at the same time.

For this reason, there has been a search for solutions which reduce the electrostatic charging of polymers.

It is known that static charging can be limited by the addition of additives which improve the surface conductivity. However, these additives have the disadvantage that they are virtually ineffective at low atmospheric humidity. In addition, they are frequently low molecular weight antistatics which, owing to their high polarity, often have poor compatibility with the substrate. In combination with the mobility which is advantageous for conductivity, this leads to washing-out of the additive. The antistatic property of the polymer decreases as a result.

For this reason, additives which are also effective at low atmospheric humidity have also been used for a long time. This is usually achieved by increasing the volume conductivity, i.e. the improved conductivity is present not only on the surface but in the entire polymer. Widespread additives for increasing the volume conductivity are, for example, carbon black or metal powder. However, these additives alter the mechanical properties of the polymers to a not inconsiderable extent. There is frequently an increase in the stiffness of the polymer provided with the antistatic or the abrasion increases. In the case of transparent polymers, in particular, additives such as carbon black or metal powder cannot be used.

To achieve a permanent antistatic effect, EP 0 613 919 A1 proposes utilizing particular polyether ester amides as antistatic additives for thermoplastic polymers. In specific embodiments, alkali metal halides or alkaline earth metal halides are additionally added.

EP0829520B1 describes a fiber-forming or fibrous organic nonconductive polymer material together with a further polymer or copolymer capable of ion conduction which is incorporated into a thermoplastic or elastomeric substrate in such a way that the conductive polymer or copolymer is essentially adsorptively bound to the fiber or dissolved therein and together therewith forms a conductive network in the thermoplastic or elastomeric substrate in which the fiber is insoluble.

A subregion of the polymer or copolymer capable of ion conduction has polar groups which can complex or solvate a salt of an inorganic or organic protic acid. The fibrous or fiber-forming organic polymeric material has to be selected so that it does not dissolve in the thermoplastic or elastomeric substrate but instead can form a network-like structure of fibers which are in contact with one another. In the case of incompatibility, demixing, delamination of the nonconductive polymeric material and of the polymer (compound) capable of ion conduction and consequently a deterioration in optical and mechanical properties of this compound occur.

EP2227391 describes a conductive multilayer structure. Here, the conductive layer is based on a thermoplastic polyurethane based on polyethylene glycol (PEG). Firstly, coating of a polymer with a second polymer is significantly more complicated in process engineering terms than compounding. At the same time, a PEG-based thermoplastic polyurethane has poor adhesion to other, in particular nonpolar, layers. This can lead to partial buildup of a charge within the nonpolar layer, which in turn can lead to spontaneous discharge and consequently to a failure of function.

EP1984438 or EP2170972 describes the effectiveness of ionic liquids in TPU. Disadvantages of the preparations described here are, firstly, that the use is restricted to polar polymers because of the high polarity of the ionic liquids. Only a very small proportion of ionic liquid can be incorporated into nonpolar polymers, as a result of which the conductivity of the polymer is insufficient in practical terms.

Owing to the abovementioned restrictions in respect of the conductivity improvers described, there is urgent interest in an additive which has an antistatic effect, is ecologically unproblematical and is effective at a low atmospheric humidity for increasing the volume conductivity of polymers, in particular nonpolar polymers. This additive should be simple to prepare, simple to incorporate into the polymer or be miscible therewith. The volume conductivity of the polymer achieved should be maintained over a long period of time and the additive should be able to be used without appreciable restriction in small amounts in all commercial polymers and impair the optics and mechanics thereof only insignificantly.

This object has surprisingly been able to be achieved by a composition comprising a thermoplastic polyurethane, where the thermoplastic polyurethane has been prepared from a) a diisocyanate, b) a polyol comprising a polyol A and a polyol B and c) a chain extender, optionally with the aid of catalysts and optionally further comprising additives and/or auxiliaries, wherein a salt and/or an ionic liquid, preferably an ionic liquid, is comprised in the composition and the polyol A comprises ethoxy and propoxy groups and the polyol B comprises butoxy groups.

The invention further provides a process for producing the composition of the invention, the use of the composition of the invention as conductivity improver and the thermoplastic polyurethane specifically developed for use as conductivity improver.

If the composition comprises a further polymer, the thermoplastic polyurethane forms a network which, in conjunction with the salt and/or the ionic liquid, forms electrically conductive tracks via which the charge can flow out of the polymer. Here, the thermoplastic polyurethane of the invention is equally suitable for nonpolar and polar polymers. The particular advantage is that it can preferably also be very readily incorporated into nonpolar polymers for which there are only few conductivity improvers. At the same time, the thermoplastic polyurethane of the invention has sufficient polarity in order to take up ion sources such as salts or ionic liquids so as to form a conductive network in the polymer.

It has for the first time become possible to use antistatic thermoplastic polyurethane in polymers such as polypropylene (PP), polyethylene (PE), polystyrene (PS) and acrylonitrile-butadiene-styrene (ABS) in which TPU has hitherto been considered to be incompatible.

The excellent compatibility in virtually all polymers has, in particular, been able to be achieved by the specific configuration of the polyol in the thermoplastic polyurethane. The polyol is composed of polyol A and polyol B, with polyol A comprising ethoxy and propoxy groups and polyol B comprising butoxy groups.

Since the thermoplastic polyurethane used for increasing the conductivity is a high molecular weight compound, a particularly curable antistatic treatment of polymers is made possible.

The properties of the composition, e.g. thermal stability, light stability and hydrolysis resistance, which apart from the thermoplastic polyurethane, a salt and/or an ionic liquid additionally comprises a polymer, are comparable. The properties of the polymer remain virtually uninfluenced in most cases.

In the range of low added amounts of the thermoplastic polyurethane and the salt and/or ionic liquid, the optical properties are also changed only little and transparent, natural-colored materials remain essentially transparent or natural-colored, which is of great importance for many fields of use.

TPU-based antistatic masterbatches produced on the basis of the production and processing processes typical for thermoplastic polyurethane can be produced significantly more economically than comparable systems based on other polymers.

The above-described advantageous effects are demonstrated further in the preferred embodiments indicated below.

DETAILED DESCRIPTION

The invention provides a composition comprising a thermoplastic polyurethane, where the thermoplastic polyurethane has been prepared from
 a) a diisocyanate,
 b) a polyol comprising a polyol A and a polyol B and
 c) a chain extender,
optionally with the aid of catalysts and optionally further comprising additives and/or auxiliaries, wherein a salt and/or an ionic liquid, preferably an ionic liquid, is comprised in the composition and the polyol A comprises ethoxy and propoxy groups and the polyol B comprises butoxy groups.

The invention further provides the thermoplastic polyurethane prepared from a) a diisocyanate, b) a polyol comprising a polyol A and a polyol B and c) a chain extender, optionally with the aid of catalysts and optionally further comprising additives and/or auxiliaries, wherein the polyol A comprises ethoxy and propoxy groups and the polyol B comprises butoxy groups.

Thermoplastic polyurethanes per se are adequately known. They are prepared by reacting (a) isocyanates with (b) compounds, also referred to as polyols, which are reactive toward isocyanates and have a number average molecular weight of from $0.5 \times 10^3$ g/mol to $300 \times 10^3$ g/mol, and optionally chain extenders having a molecular weight of $0.05 \times 10^3$ g/mol to $0.499 \times 10^3$ g/mol, optionally with the aid of catalysts and/or additives and/or auxiliaries.

The components (a) isocyanate, (b) compounds, also referred to as polyol, which are reactive toward isocyanates and (c) chain extenders are also referred to individually or collectively as formative components.

As organic isocyanates (a), preference is given to using aliphatic, cycloaliphatic, araliphatic and/or aromatic isocyanates, preferably diisocyanates, more preferably aliphatic diisocyanates, more preferably trimethylene, tetramethylene, pentamethylene, hexamethylene, heptamethylene and/or octamethylene diisocyanate, 1,6-hexamethylene diisocyanate (HDI), 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-cyclohexane diisocyanate and/or dicyclohexylmethane 4,4'-, 2,4'- and 2,2'-diisocyanate (H12MDI), and/or 2,4-tetramethylenexylene diisocyante (TMXDI). The diisocyanate is more preferably selected from the group consisting of: pentamethylene 1,5-diisocyanate, hexamethylene 1,6-diisocyanate (HDI), 1-isocyanato-3,3,5-trimethyl-5-isocyanatomethylcyclohexane (isophorone diisocyanate, IPDI), cyclohexane 1,4-diisocyanate, 1-methylcyclohexane 2,4- and 2,6-diisocyanate and dicyclohexylmethane 4,4'-, 2,4'- and 2,2'-diisocyanate (H12MDI). Particular preference is given to hexamethylene diisocyanate, in particular 1,6-hexamethylene diisocyanate (HDI).

As compounds (b) which are reactive toward isocyanates, preference is given to using polyesterols or polyetherols, which are also summarized under the term "polyols". Polyetherols are preferred. The number average molecular weights of these polyols are in the range from $0.5 \times 10^3$ kg/mol to $8 \times 10^3$ kg/mol, preferably from $0.6 \times 10^3$ g/mol to $5 \times 10^3$ g/mol, in particular from $0.8 \times 10^3$ g/mol to $3 \times 10^3$ kg/mol. The polyols preferably have an average functionality in the range from 1.8 to 2.4, preferably from 1.9 to 2.2, in particular 1.95-2.05. The polyols (b) preferably have only primary hydroxyl groups.

According to the invention, the polyol comprises at least two polyols, viz. polyol A and polyol B, with polyol A comprising ethoxy groups and propoxy groups and polyol B comprising butoxy groups.

In a preferred embodiment, the molar percentage of the ethoxy and propoxy groups and butoxy groups in the composition 1 is in each case at least 5 mol %, preferably at least 10 mol %, based on the mole weight of the total polyol. Further preference is given to the proportion of ethoxy groups in the polyol in the composition 1 at the same time being at least 25 mol %, more preferably at least 40 mol %, more preferably at least 60 mol % and particularly preferably at least 65 mol %, based on the total polyol.

Very particular preference is given to the molar percentage of the ethoxy group being in the range from 70 mol % to 75 mol %, the proportion of the propoxy group being in the range from 12 mol % to 18 mol % and the proportion of the butoxy groups being in the range from 12 mol % to 18 mol %, based on the total polyol.

The determination of the molar percentage is carried out by means of $^1$H NMR in accordance with ASTM D4875-11 (2011) Standard Test Methods of Polyurethane Raw Materials: Determination of the Polymerized Ethylene Oxide Content of Polyether Polyols.

Further preference is given to the polyol B in the composition 1 being a homopolymer. A homopolymer is a polymer which is made up of virtually only one monomer group, i.e. essentially does not comprise any other monomers. "Essentially" means that at least 95 mol % of the homopolymer consists of only one monomer, more preferably at least 97.5 mol % and particularly preferably at least 99 mol %.

Furthermore, the polyol A in the composition 1 is preferably a block copolymer having one block and two ends, with the block comprising ethoxy and propoxy groups and the two ends of the block copolymer comprising exclusively ethoxy groups. In this block polymer, the proportion of ethoxy groups in the two ends of the block copolymer is preferably more than 5 mol %, preferably at least 10 mol % and particularly preferably at least 15 mol %, based on the number average molecular weight of the total block copolymer. The ends of the block copolymer very particularly preferably comprise from 10 mol % to 20 mol % of the ethoxy groups, based on the total block copolymer, and the block of the block copolymer comprises in the range from 60 mol % and 70 mol % of ethoxy groups and in addition from 15 mol % to 20 mol % of propoxy groups, based on the total block copolymer.

Polyol A is prepared by adding the desired cyclic alkylene oxides, in the present case ethylene oxide and propylene oxide, to a bifunctional starter molecule in a reactor in a $1^{st}$ step, so that the cyclic alkylene oxides polymerize with ring opening to form a prepolymer. Preference is given to using starter molecules having two OH groups, which are preferably primary OH groups. Very particularly preferred examples are 1,2-ethylene glycol, also referred to as monoethyl glycol (MEG), diethylene glycol (DEG), monopropanediol (MPG), preferably 1,3-propylene glycol, and also dipropanediol (DPG), preferably 4-oxa-1,7-heptanediol. The structure of the prepolymer can be determined by the addition of the alkylene oxides. If ethylene oxide and then propylene oxide are added alternately, blocks of these monomers are formed in the prepolymer as a function of the amounts added; this is also referred to as the block mode of operation. If both alkylene oxides are added simultaneously, the alkylene oxides react arbitrarily, which is also referred to as the mixed mode of operation. The mixed mode of operation is preferred. A person skilled in the art can control the structure of the polyol and the molar distribution of the monomers within a narrow range on the basis of the molecular weights of the alkylene oxides and control of the amounts added. In a preferred embodiment, exclusively ethylene oxide is added in a step 2 to the prepolymer from step 1, so that the polyol A has ethoxy groups at the ends.

The ring-opening polymerization is carried out with the aid of catalysts. Here, preference is given to basic catalysts such as alkali metal or alkaline earth metal hydroxides or alkali metal or alkaline earth metal alkoxides, preferably NaOH, KOH, CsOH or sodium methoxide and potassium methoxide. Other preferred catalysts are ones which comprise functional amino groups; preferred examples are N,N-dimethylethanolamine (DMEOA) or imidazole. A third group of preferred catalysts is carbenes, preferably N-heterocyclic carbenes.

The product obtained in step 2 is precipitated by means of a precipitant in step 3. Precipitants are usually proton donors; examples of preferred precipitants are carbonic acid ($H_2CO_3$), phosphoric acid ($H_3PO_4$). The polymer worked up in step 3 is filtered in a $4^{th}$ step in order to remove the catalyst. Binders are used as filtration aids; preferred examples of binders are cellulose or silica gel. Polyol B is prepared analogously, with exclusively butylene oxide being used in step 1 and step 2 being omitted.

A preferred polyol A is the polyol which can be procured under the name Lupranol VP9243 from BASF Polyurethanes GmbH in October 2013.

Chain Extenders

In preferred embodiments, chain extenders are comprised in the thermoplastic polyurethane of the composition 1. These are preferably aliphatic, araliphatic, aromatic and/or cycloaliphatic compounds having a molecular weight of from $0.05 \times 10^3$ kg/mol to $0.499 \times 10^3$ g/mol. The chain extenders are preferably 2-functional compounds, i.e. they have two groups which are reactive toward isocyanates. Preferred chain extenders are diamines and/or alkanediols having from 2 to 10 carbon atoms in the alkylene radical, in particular 1,4-butanediol, 1,6-hexanediol and/or dialkylene, trialkylene, tetraalkylene, pentaalkylene, hexaalkylene, heptaalkylene, octaalkylene, nonaalkylene and/or decaalkylene glycols having from 3 to 8 carbon atoms, preferably corresponding oligopropylene and/or polypropylene glycols, with mixtures of the chain extenders preferably also being able to be used. The compounds (c) preferably have only primary hydroxyl groups. 1,3-propanediol, 1,4-butanediol or 1,6-hexanediol or any combination, i.e. 1,3-propanediol and 1,4-butanediol, or 1,3-propanediol and 1,6-hexanediol, or 1,4-butanediol and 1,6-hexanediol, or 1,6-hexanediol is very particularly preferably used for preparing the thermoplastic polyurethane in the composition 1. 1,6-Hexanediol is very particularly preferably used.

Ionic Liquid

In a preferred embodiment, the salt and/or the ionic liquid is comprised in an amount of from 0.1% by weight to 25% by weight, preferably from 1% by weight to 10% by weight, more preferably from 1.5% by weight to 7.5% by weight and particularly preferably from 2% by weight to 5% by weight, in the thermoplastic polyurethane of the composition 1. The % by weight is based on the total amount of the thermoplastic polyurethane into which the salt and/or the ionic liquid has been incorporated.

In principle, any salt or any ionic liquid is suitable for being incorporated into the thermoplastic polyurethane of the invention in order to function as solubility improver in the composition and when mixed with a polymer to increase its conductivity.

Suitable ionic liquids may be found in WO 2011/069960. This document is incorporated by reference into the present patent application.

The ionic liquid is either a single substance or a mixture of various substances.

The ionic liquids are preferably liquid at a temperature above 210° C., preferably above 200° C. and particularly preferably above 190° C.

A preferred group of ionic liquids is ionic liquids comprising an imidazole ring. Particular preference is given to the 1-butyl-3-methylimidazolium ion (BMIM) or the 1-ethyl-3-methylimidazolium ion (EMIM), which are further preferably used as solvate.

Another group of preferred ionic liquids comprise a diazabicyclo structure, with particular preference being given to the monoprotonated form of 1,8-diazabicyclo[5.4.0]undec-7-ene (DBU) or of 1,5-diazabicyclo[4.3.0]non-5-ene.

In a preferred embodiment, only one ionic liquid is incorporated into the thermoplastic polyurethane, while in another preferred embodiment the thermoplastic polyurethane comprises at least two ionic liquids.

Salt

Preferred salts which can be used to increase the conductivity in the thermoplastic polyurethane are salts of an inorganic or low molecular weight organic protic acid. Low molecular weight means that the molecular weight of the protic acid is less than 500 g/mol, preferably less than 400 g/mol and particularly preferably less than 300 g/mol.

The salt is preferably an alkaline earth metal salt as mentioned above, a perchlorate or a quaternary ammonium salt, particularly preferably selected from the group consisting of $LiClO_4$, $LiCF_3SO_3$, $NaClO_4$, $LiBF_4$, $NaBF_4$, $KBF_4$, $NaCF_3SO_3$, $KClO_4$, $KPF_6$, $KCF_3SO_3$, $KC_4F_9SO_3$, $Ca(ClO_4)$, $Ca(PF_6)$, $Mg(ClO_4)$, $Mg(CF_3SO_3)$, $Zn(ClO_4)$, $Zn(PF_6)$, $Ca(CF_3SO_3)$, quaternary ammonium ethosulfate, mixtures of fatty acid-polyol esters and sodium perchlorate, partial fatty acid esters, alkali metal salts of quaternary ammonium compounds in combination with sodium dicyanamide, the Na salt of dodecylbenzenesulfonic acid and 1-hydroxy-tallow-1-trimethylammonium chloride [Plastat C 100, from New Japan Chemical Co. Ltd. Preference is given to the Li salts $LiClO_4$, $LiCF_3SO_3$, $NaClO_4$, $LiBF_4$, with very particular preference being given to $LiCF_3SO_3$. A salt is, in a preferred embodiment, used alone in the thermoplastic polyurethane. In other preferred embodiments, at least two salts are used. In further preferred embodiments, at least one salt and an ionic liquid are added to the thermoplastic polyurethane.

The invention further provides a mixture comprising a composition as described above and at least one polymer. As indicated above, the composition can, due to the thermoplastic polyurethane of the invention, be readily incorporated into virtually all customary polymers or mixtures thereof, i.e. both into nonpolar polymers and into polar polymers. Preference is given to the group consisting of nonpolar polymers since fewer conductivity improvers are available for this group. The polymer is more preferably selected from the group consisting of polyethylene, polypropylene, polystyrene, polyoxymethylene, ethylene-vinyl acetate, acrylonitrile-butadiene-styrene, polyvinyl chloride, thermoplastic polyurethane whose composition differs, in a preferred embodiment, from the composition of the thermoplastic polyurethane into which the salt and/or the ionic liquid has been incorporated. The polymer is particularly preferably selected from the group consisting of polyethylene, polypropylene and polystyrene [KE1].

The thermoplastic polyurethane is more preferably comprised in a proportion by weight of more than 1% by weight and less than 50% by weight, preferably more than 5% by weight and less than 35% by weight, particularly preferably more than 15% by weight and less than 30% by weight, in the composition.

Catalysts

Catalysts (d) which, in particular, accelerate the reaction between the NCO groups of the diisocyanates (a) and the hydroxyl groups of the compound (b), also referred to as polyol, which are reactive toward isocyanates and the chain extenders (c) are, in a preferred embodiment, tertiary amines, in particular triethylamine, dimethylcyclohexylamine, N-methylmorpholine, N,N'-dimethyl-piperazine, 2-(dimethylaminoethoxy)ethanol, diazabicyclo[2.2.2]octane; in another preferred embodiment these are organic metal compounds such as titanic esters, iron compounds, preferably iron(III) acetylacetonate, tin compounds, preferably tin diacetate, tin dioctoate, tin dilaurate or the dialkyltin salts of aliphatic carboxylic acids, preferably tin dioctoate, tetrabutyl orthotitanate or bismuth salts in which bismuth is preferably present in the oxidation states 2 or 3, in particular 3, with preference being given to salts of carboxylic acids, preferably carboxylic acids having from 6 to 14 carbon atoms, particularly preferably from 8 to 12 carbon atoms.

Preferred bismuth salts are bismuth(III) neodecanoate, bismuth 2-ethylhexanoate and bismuth octanoate.

The catalysts (d) are preferably used in amounts of from 0.0001 to 0.1 part by weight per 100 parts by weight of the compound (b), also referred to as polyol, which is reactive toward isocyanates. Preference is given to using tin catalysts, in particular tin dioctoate.

Auxiliaries/Additives

Apart from catalysts, auxiliaries and/or additives can also be added to the formative components (a) to (c). Mention may be made by way of example of surface-active substances, fillers, flame retardants, nucleating agents, oxidation stabilizers, lubricants and mold release agents, dyes and pigments, optionally stabilizers, e.g. against hydrolysis, light, heat or discoloration, inorganic and/or organic fillers, reinforcing agents and plasticizers. As hydrolysis inhibitors, preference is given to using oligomeric and/or polymeric aliphatic or aromatic carbodiimides. In order to stabilize the TPU of the invention against aging, stabilizers are preferably added to the TPU. For the purposes of the present invention, stabilizers are additives which protect a plastic or a plastics mixture against harmful environmental influences. Examples are primary and secondary antioxidants, hindered amine light stabilizers, UV absorbers, hydrolysis inhibitors, quenchers and flame retardants. Examples of commercial stabilizers may be found in Plastics Additive Handbook, 5th Edition, H. Zweifel, ed., Hanser Publishers, Munich, 2001 ([1]), p. 98-p. 136.

In a preferred embodiment, the UV absorbers have a number average molecular weight of greater than $0.3 \times 10^3$ g/mol, in particular greater than $0.39 \times 10^3$ g/mol. Furthermore, the UV absorbers which are preferably used should have a molecular weight of not greater than $5 \times 10^3$ g/mol, particularly preferably not greater than $2 \times 10^3$ g/mol.

Particularly suitable UV absorbers are the group of benzotriazoles. Examples of particularly suitable benzotriazoles are Tinuvin® 213, Tinuvin® 234, Tinuvin® 571 and Tinuvin® 384 and Eversorb®82. The UV absorbers are usually added in amounts of from 0.01 to 5% by weight, based on the total mass of the TPU, preferably 0.1-2.0% by weight, in particular 0.2-0.5% by weight.

A UV stabilization as described above based on an antioxidant and a UV absorber is often still not sufficient to ensure good stability of the TPU of the invention against the damaging influence of UV rays. In this case, a hindered amine light stabilizer (HALS) can be added in addition to the antioxidant and the UV absorber to the TPU of the invention. The activity of the HALS compounds is based on their ability to form free nitroxyl radicals which interfere in the mechanism of the oxidation of polymers. HALSs are highly efficient UV stabilizers for most polymers.

HALS compounds are generally known and commercially available. Examples of commercially available HALSs may be found in Plastics Additive Handbook, 5th edition, H. Zweifel, Hanser Publishers, Munich, 2001, pp. 123-136.

As hindered amine light stabilizers, preference is given to employing hindered amine light stabilizers in which the number average molecular weight is greater than 500 g/mol. Furthermore, the molecular weight of the preferred HALS compounds should be not greater than 10 000 g/mol, particularly preferably not greater than 5000 g/mol.

Particularly preferred hindered amine light stabilizers are bis(1,2,2,6,6-pentamethylpiperidyl) sebacate (Tinuvin® 765, Ciba Spezialitatenchemie AG) and the condensation product of 1-hydroxyethyl-2,2,6,6-tetramethyl-4-hydroxypiperidine and succinic acid (Tinuvin® 622). Particular preference is given to the condensation product of 1-hydroxyethyl-2,2,6,6-tetramethyl-4-hydroxypiperidine and succinic acid (Tinuvin® 622) when the titanium content of the product is <150 ppm, preferably <50 ppm, in particular <10 ppm.

HALS compounds are preferably used in a concentration of from 0.01 to 5% by weight, particularly preferably from 0.1 to 1% by weight, in particular from 0.15 to 0.3% by weight.

A particularly preferred UV stabilization system comprises a mixture of a phenolic stabilizer, a benzotriazole and an HALS compound in the above-described preferred amounts.

In a preferred embodiment of the composition, hydrolysis inhibitors are comprised as auxiliaries in addition to the diisocyanate, the polyol and the chain extender; preference is given here to oligomeric and/or polymeric aliphatic or aromatic carbodiimides.

Further details regarding the abovementioned auxiliaries and additives may be found in the specialist literature, for example in Plastics Additive Handbook, 5th edition, H. Zweifel, ed., Hanser Publishers, Munich, 2001.

Preparation

The preparation of the thermoplastic polyurethanes is carried out batchwise or continuously by known methods, preferably using reaction extruders or the belt process by the one-shot process or the prepolymer process, preferably by the one-shot process. In this process, the components isocyanates, polyols and optionally chain extenders and/or catalyst and/or additives and/or auxiliaries to be reacted can be mixed with one another in succession or simultaneously, with the reaction commencing immediately. In the extruder process, the formative components isocyanate, polyol and optionally chain extenders and/or additive and/or auxiliaries are introduced individually or as a mixture into the extruder, reacted at temperatures of preferably from 100° C. to 280° C., more preferably from 140° C. to 250° C., and the polyurethane obtained is extruded, cooled and pelletized.

To prepare flexible thermoplastic polyurethanes having a Shore A hardness of less than 95, preferably from 95 Shore A to 75 Shore A, the polyols and chain extenders can advantageously be used in molar ratios of from 1:1 to 1:15, preferably from 1:2.5 to 1:10. To prepare more rigid TPUs having a hardness of greater than 98 Shore A, preferably from 55 Shore D to 75 Shore D, the molar ratios of polyol to chain extenders are in the range from 1:10 to 1:20, preferably from 1:12 to 1:15.

To prepare the TPUs of the invention, the formative components diisocyanate and polyol and optionally catalysts and/or auxiliaries and/or additives are reacted in such amounts that the equivalence ratio of NCO groups of the diisocyanates (a) to the sum of the hydroxyl groups of the polyols and chain extenders is 0.95-1.10:1, preferably 0.98-1.08:1 and in particular about 1.0-1.05:1.

The composition is produced by preparing thermoplastic polyurethane as described above in a step A and mixing this thermoplastic polyurethane with a salt or an ionic liquid, preferably an ionic liquid, in a step B. The composition can comprise further constituents.

In an embodiment, the mixture according to the invention comprising at least the thermoplastic polyurethane and a salt and/or an ionic liquid, preferably an ionic liquid, is produced by preparing the thermoplastic polyurethane in a step A, mixing this thermoplastic polyurethane with a salt and/or an ionic liquid, preferably an ionic liquid, in a step B and then mixing the product of step A and B with a polymer.

In another preferred embodiment, the composition of the invention comprising at least the thermoplastic polyurethane and a salt and/or an ionic liquid, preferably an ionic liquid, is produced by preparing the thermoplastic polyurethane from the components diisocyanate, polyol, chain extenders and optionally additional catalyst, auxiliary and/or additives in one step (one-shot process) and adding salt and/or ionic liquid, preferably only ionic liquid, in the same production step. This inventive composition is then mixed with a polymer.

The composition comprising the thermoplastic polyurethane according to the invention and a salt or an ionic liquid is particularly suitable for use as conductivity improver in mixtures with other polymers.

Polymers themselves frequently have insufficient conductivity, as a result of which the disadvantages and hazards indicated at the outset can occur.

Addition of the composition of the invention improves the conductivity of the polymer over the entire volume and thus significantly reduces the disadvantages and hazards indicated at the outset.

EXAMPLES

All compositions and mixtures according to the invention and also the comparative samples of the antistatic thermoplastic polyurethanes (TPU) of examples 1 to 5 were produced by the "one-shot" process on a reaction extruder. Here, all constituents of the composition were introduced into the reaction extruder.

The materials can equally well be produced by the casting process. Subsequent incorporation of the salt and/or the ionic liquid by swelling-in or compounding, i.e. mixing the salt and/or the ionic liquid in to the molten thermoplastic polyurethane (TPU), leads to comparable results.

The production of the compositions and mixtures was carried out on a commercial twin-screw extruder, here a Coperion ZSK, at the process temperatures of from 160° C. to 240° C. customary for TPU, as described in EP 1846465 or EP1213307. The amounts of the individual constituents are reported as parts by weight (pbw).

Example 1: Production of an Antistatic, Aromatic, Thermoplastic Polyurethane (Comparison 1)

The composition (=100 pbw) comprising 37 pbw of methylenebis(phenyl) 4,4'-isocyanate (MDI), 10.2 pbw of 1,4-butanediol and 51.3 pbw of polyethylene glycol (PEG) having a number average molecular weight (Mn) of $1.5 \times 10^3$ g/mol is converted into a thermoplastic polyurethane (TPU) in a reaction extruder. Also comprised are 1 part by weight of 1-ethyl-3-methyl-1-imidazolium ethylsulfate, (EMIM ETOSO$_3$) and 0.5 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis (1-methyl-1-phenylethyl)phenol) and lubricant (montanic ester).

Example 2: Production of an Antistatic, Aliphatic, Thermoplastic Polyurethane (Comparison 2)

The composition (=100 pbw) comprising 21.4 pbw of hexamethylene diisocyanate (HDI), 7.4 pbw of 1,6-hexanediol and 66.7 pbw of polytetramethylene glycol (PTMG) having a number average molecular weight ($M_n$) of $1.0 \times 10^3$ g/mol is converted into a thermoplastic polyurethane (TPU) in a reaction extruder. Also incorporated are 4 parts by weight of a 1-ethyl-3-methyl-1-imidazolium ethylsulfate, (EMI N ETOSO$_3$) and 0.5 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis(1-methyl-1-phenylethyl)-phenol) and lubricant (montanic ester).

Example 3: Production of an Antistatic, Aliphatic, Thermoplastic Polyurethane (Comparison 3)

The composition (=100 pbw) comprising 21.2 pbw of hexamethylene diisocyanate (HDI), 9.9 pbw of 1,6-hexanediol and 64.4 pbw of a polymer diol having a molar mass of $1.5 \times 10^3$ g/mol derived from polyethylene glycol (PEG) is converted into a thermoplastic polyurethane (TPU) in a reaction extruder. Also incorporated are 4 parts by weight of a 1-ethyl-3-methyl-1-imidazolium ethylsulfate, (EMIM $ETOSO_3$ for short) and 0.5 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis(1-methyl-1-phenyl)ethyl)phenol) and lubricant (montanic ester).

Example 4: Production of an Antistatic, Aliphatic, Thermoplastic Polyurethane (Batch 1 According to the Invention)

The composition (=100 pbw) comprising 19.9 pbw of hexamethylene diisocyanate (HDI), 10.2 pbw of 1,6-hexanediol and 52.2 pbw of a bifunctional polymer diol having a number average molecular weight $2.25 \times 10^3$ g/mol derived from a mixture of polypropylene oxide and polyethylene oxide (PPG-PEG for short, 1:4, random copolymer having primary functional end groups) and 13.2 pbw of a polytetramethylene glycol (PTMG for short) having a number average molecular weight of $2.0 \times 10^3$ g/mol are converted into a thermoplastic polyurethane (TPU) in a reaction extruder. Also incorporated are 4 parts by weight of a 1-ethyl-3-methyl-1-imidazolium ethylsulfate, (EMIN $ETOSO_3$ for short) and 0.5 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis(1-methyl-1-phenylethyl)phenol) and lubricant (montanic ester).

Example 5: Production of an Antistatic Thermoplastic Polyurethane Based on an Aromatic Isocyanate (Comparison 4)

The composition (=100 pbw) comprising 30.5 pbw of methylenebis(phenyl 4,4'-isocyanate) (MDI), 8.5 pbw of 1,4-butanediol and 45.2 pbw of a bifunctional polymer diol having a number average molecular weight of $2.25 \times 10^3$ g/mol derived from a mixture of polypropylene oxide and polyethylene oxide (PPG-PEG for short, 1:4, random copolymer having primary functional end groups) and 11.3 pbw of a polymer diol having a molar mass of $2.0 \times 10^3$ g/mol derived from polytetramethylene glycol (PTMG for short) is converted into a thermoplastic polyurethane (TPU) in a reaction extruder. Also incorporated are 4 parts by weight of a 1-ethyl-3-methyl-1-imidazolium ethylsulfate, (EMIN $ETOSO_3$ for short) and 0.5 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis(1-methyl-1-phenylethyl)phenol) and lubricant (montanic ester).

Example 6: Production of an Antistatic Thermoplastic Polymer Blend (Comparison 5)

As a further comparison, a polymer blend was produced on a commercial compounding extruder; a polyether ester amide, here Pebax 1657 (from Arkema, FR), polyamide 12, here Rilsan PA12 (from Arkema), and a salt, here $NaClO_4$ and a UV stabilizer packet were mixed, with the constituents mentioned being added in the order indicated in the following weight ratio (4.7:4.8:0.2:0.3).

Example 7: Production of an Antistatic, Aliphatic, Thermoplastic Polyurethane (Batch 2 According to the Invention)

The composition (=100 pbw) comprising 40.1 pbw of hexamethylene diisocyanate (HDI), 20 pbw of 1,4-butanediol and 24.4 pbw of a bifunctional polymer diol having a number average molecular weight of $2.25 \times 10^3$ g/mol and derived from a mixture of polypropylene oxide and polyethylene oxide (PPG-PEG for short, 1:4, random copolymer having primary functional end groups) and 10.5 pbw of a polytetramethylene glycol (PTMG for short) having a number average molecular weight of $2.0 \times 10^3$ g/mol are converted into a thermoplastic polyurethane (TPU) in a reaction extruder. Also incorporated are 4 parts by weight of a 1-ethyl-3-methyl-1-imidazolium ethylsulfate (EMIN $ETOSO_3$ for short) and 0.95 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis(1-methyl-1-phenylethyl)phenol) and lubricant (montanic ester).

Example 8: Production of an Antistatic, Aliphatic, Thermoplastic Polyurethane (Batch 3 According to the Invention)

The composition (=100 pbw) comprising 20.5 pbw of hexamethylene diisocyanate (HDI), 8 pbw of 1,6-hexanediol, 1.7 pbw of 1,3-propanediol and 52.2 pbw of a bifunctional polymer diol having a number average molecular weight of $2.25 \times 10^3$ g/mol and derived from a mixture of polypropylene oxide and polyethylene oxide (PPG-PEG for short, 1:4, random copolymer having primary functional end groups) and 13 pbw of a polytetramethylene glycol (PTMG for short) having a number average molecular weight of $2.0 \times 10^3$ g/mol are converted into a thermoplastic polyurethane (TPU) in a reaction extruder. Also incorporated are 3.5 parts by weight of a 1-ethyl-3-methyl-1-imidazolium ethylsulfate (EMIN $ETOSO_3$ for short) and 0.95 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis(1-methyl-1-phenylethyl)phenol) and lubricant (montanic ester).

Example 9: Production of an Antistatic, Aliphatic, Thermoplastic Polyurethane (Batch 4 According to the Invention)

The composition (=100 pbw) comprising 21.1 pbw of hexamethylene diisocyanate (HDI), 2.7 pbw of 1,6-hexanediol, 6.4 pbw of 1,4-butanediol and 52.2 pbw of a bifunctional polymer diol having a number average molecular weight of $2.25 \times 10^3$ g/mol and derived from a mixture of polypropylene oxide and polyethylene oxide (PPG-PEG for short, 1:4, random copolymer having primary functional end groups) and 13 pbw of a polytetramethylene glycol (PTMG for short) having a number average molecular weight of $2.0 \times 10^3$ g/mol are converted into a thermoplastic polyurethane (TPU) in a reaction extruder. Also incorporated are 3.5 parts by weight of a 1-ethyl-3-methyl-1-imidazolium ethylsulfate (EMIN ETOSO$_3$ for short) and 0.95 pbw of a mass-equivalent mixture of antioxidant (AO, hindered phenol derived from pentaerythritol and di-tert-butyl hydroxyphenylpropionate), hindered amine light stabilizer (HALS, condensation product of 1-hydroxyethyl-2,2,6,6-tetramethyl-4-hydroxypiperidine and succinic acid), UV filter (2-(2H-benzotriazol-2-yl)-4,6-bis(1-methyl-1-phenylethyl)phenol) and lubricant (montanic ester).

TABLE 1

Overview of the formulations of the antistatic thermoplastic polyurethanes

| Formulation | Example 1 Comparison 1 | Example 2 Comparison 2 | Example 3 Comparison 3 | Example 4 Batch 1 according to the invention | Example 5 Comparison 4 | Example 6 Comparison 5 | Example 7 Batch 2 according to the invention | Example 8 Batch 3 according to the invention | Example 9 Batch 4 according to the invention |
|---|---|---|---|---|---|---|---|---|---|
| PTMG, Mn = $1.0 \times 10^3$ g/mol | | 66.7 | | | | | | | |
| PTMG, Mn = $2.0 \times 10^3$ g/mol | | | | 13.2 | 11.3 | | 10.5 | 13 | 13 |
| PEG, Mn = $1.5 \times 10^3$ g/mol | 51.3 | | 64.4 | | | | | | |
| PEG-PPG, Mn = $2.25 \times 10^3$ g/mol | | | | 52.2 | 45.2 | | 24.4 | 52.1 | 52.1 |
| MDI | 37.0 | | | | 30.5 | | | | |
| HDI | | 21.4 | 21.2 | 19.9 | | | 40.1 | 20.5 | 21.1 |
| 1,6-Hexanediol | | | 9.9 | 10.2 | | | | 8 | 2.7 |
| 1,4-Butanediol | 10.2 | 7.4 | | | 8.5 | | 20 | | 6.4 |
| 1,3-Propanediol | | | | | | | | 1.7 | |
| EMIM ETSO$_4$ | 1.0 | 4.0 | 4.0 | 4.0 | 4.0 | | 4 | 3.5 | 3.5 |
| mass-equivalent mixture of AO, HALS, UV and wax | 0.5 | 0.5 | 0.5 | 0.5 | 0.5 | | 0.95 | 1.2 | 1.2 |
| Polymer blend, reference | | | | | | 100 | | | |

110×100×2 mm test specimens, also referred to as test plates, were injection-molded from the preparations described under examples 1 to 9 on an injection-molding machine, here an Aarburg 420C. The TPU pellets were predried beforehand at 110° C. for 3 hours. The maximum temperature of the melt in the production of the test specimens was from 210° C. to 220° C.

For better comparability, the test specimens were, after production, firstly stored for 15 hours at 100° C. and then for a further 72(+/−10) hours under standard conditions at 23° C. and 50% relative atmospheric humidity.

Assessment of the antistatic properties was carried out in accordance with DIN IEC 60093 (resistance measurement). 5 cm long electrodes were applied using conductive silver at a spacing of 0.5 cm to the test plates and the specific surface resistance was determined in accordance with IEC 60093. Determination of the specific surface resistance was carried out under standard conditions at 23° C. and 50% relative atmospheric humidity on test specimens which had not been heat treated.

The electrical properties of the pure TPU are shown below. 5 cm long electrodes were applied by means of conductive silver at a spacing of 0.5 cm to the test plates and the specific surface resistance was measured in accordance with IEC 60093. The determination of the specific surface resistance in examples 1 to 6 was carried out under standard conditions at 23° C. and 50% relative atmospheric humidity on test specimens which had not been heat treated.

The compatibility with the substrate was determined on the above-described test specimens by visual assessment of the test plates before and after a bending test. For this purpose, the test plates were bent by 180° so that the opposite sides of the test plate contacted one another both along and transverse to the flow direction of the melt. A visual assessment was carried out and was graded according

TABLE 2

Overview of the electrical properties for the formulations of the antistatic thermoplastic polyurethanes and the polymer mixture from table 1

| Testing of the electrical properties | Standard | Unit | Example 1 Comparison 1 Result | Example 2 Comparison 2 Result | Example 3 Comparison 3 Result | Example 4 Batch 1 according to the invention Result | Example 5 Comparison 4 Result | Example 6 Comparison 5 Result | Example 7 Batch 2 according to the invention Result | Example 8 Batch 3 according to the invention Result | Example 9 Batch 4 according to the invention Result |
|---|---|---|---|---|---|---|---|---|---|---|---|
| Spec. surface resistance | IEC 60093 using conductive silver electrodes with counterelectrode | ohm | 9.60E+06 | 3.70E+08 | 9.60E+06 | 2.30E+06 | 1.10E+08 | 4.40E+07 | 3.40E+07 | 2.90E+07 | 2.00E+07 |
| Spec. surface resistance | IEC 60093 using conductive silver electrodes without counterelectrode | ohm | 3.60E+05 | 1.30E+08 | 3.50E+05 | 8.80E+05 | 3.50E+06 | 5.90E+06 | 2.70E+06 | 6.80E+05 | 6.60E+05 |

Description of the Procedure for Examples 10 to 54—Antistatic Compounds

The antistatic thermoplastic polyurethanes and the polymer blend serving as conductivity imparters described under examples 1 to 9, which were present as pellets, were added in an amount of 15% by weight to the polymers described below, which were likewise present as pellets, and injection-molded as dry blend, i.e. as mixture of pellets, on an Aarburg 420C injection-molding machine at a suitable temperature to give 110×100×2 mm test specimens, also referred to as test plates. The dry blend is also referred to as compound. The pellets of the antistatic, thermoplastic polymers from examples 1 to 9 were dried beforehand at 110° C. for 3 hours. The maximum temperature of the melt in the production of the test specimens was from 210° C. to 230° C.

For better comparability, the test specimens were, after production, stored for 72(+/−10) hours under standard conditions at 23° C. and 50% relative atmospheric humidity.

S2 test rods in accordance with DIN 53504, October 2009, were stamped out of the test specimens obtained in this way. The mechanical tests were carried out in accordance with DIN ISO 7619, part 1, February 2012, (Shore), 53504, October 2009 (tensile strength, elongation), DIN EN ISO 1183-1A, April 2013 (density), DIN ISO 34-1, B (b), July 2004 (tear propagation resistance) and DIN EN ISO 179-1, January 2001 (low-temperature impact toughness).

The assessment of the antistatic properties was carried out in accordance with DIN IEC 60093 (resistance measurement). 5 cm long adhering electrodes, here conductive silver, were applied at a spacing of 0.5 cm to the test plates and the specific surface resistance and also the specific volume resistance were determined in accordance with IEC 60093. The determination of the resistances was carried out at 23° C. and 50% relative atmospheric humidity.

to compatibility with the substrate as "+" for good compatibility, "o" for moderate compatibility and "−" for incompatibility.

Good compatibility means that the test plate has a homogeneous appearance and after bending does not lead to any or only to slight delamination without fracture. Moderate compatibility means that the test specimen has an inhomogeneous appearance and leads after bending to delamination without fracture. Incompatibility means that the test plate has a very inhomogeneous appearance and displays delamination and, after bending, leads to severe delamination and fracture.

All results are shown below in table form, classified according to substrate, i.e. the polymer to which the conductivity imparters were added.

In examples 10 to 18 and table 3, this has been done for polypropylene (PP). In examples 19 to 27 and table 4, this has been done for polystyrene (PS). In examples 28 to 36 and table 5, this has been done for polyethylene (PE). In examples 37 to 45 and table 6, this has been done for polyoxymethylene (POM). In examples 46 to 54 and table 7, this has been done for polyvinylchloride (PVC).

Examples 10 to 18, Production and Assessment of Antistatic Polypropylene Compounds

Example 10: Production of the Reference Sample Based on Pure Polypropylene 1600 g of polypropylene, HD 120 MO from *Borealis*, were injection-molded under the above-described conditions to give 110×100×2 mm test specimens, conditioned and tested. The measured values are shown in table 3.

Example 11: Production of an Antistatic Polypropylene Compound with TPU as Per Example 2 (Comparison 2)

1360 g of polypropylene, HD 120 MO from *Borealis*, were blended with 240 g of the TPU described in example 2 and injection-molded as dry blend, i.e. as a mixture of pellets, under the above-described conditions to give 110×100×2 mm test specimens, conditioned and tested. The measured values are shown in table 3.

Example 12: Production of a Polypropylene Compound with Antistatic TPU as Per Example 3 (Comparison 3)

1360 g of polypropylene, HD 120 MO from *Borealis*, were blended with 240 g of the antistatic TPU described in example 3 and injection-molded as dry blend, i.e. as mixture of pellets, under the above-described conditions to give 110×100×2 mm test specimens, conditioned and tested. The measured values are shown in table 3.

Example 13: Production of a Polypropylene Compound with Antistatic TPU as Per Example 4 (Batch 1 According to the Invention)

1360 g of polypropylene, HD 120 MO from *Borealis*, were blended with 240 g of the antistatic TPU described in example 4 and injection-molded as dry blend, i.e. as mixture of pellets, under the above-described conditions to give 110×100×2 mm test specimens, conditioned and tested. The measured values are shown in table 3.

Example 14: Production of a Polypropylene Compound with Antistatic TPU as Per Example 5 (Comparison 4)

1360 g of polypropylene, HD 120 MO from *Borealis*, were blended with 240 g of the antistatic TPU described in example 5 and injection-molded as dry blend, i.e. as mixture of pellets, under the above-described conditions to give 110×100×2 mm test specimens, conditioned and tested. The measured values are shown in table 3.

Example 15: Production of a Polypropylene Compound with Antistatic Polymer Blend as Per Example 6 (Comparison 5)

1360 g of polypropylene, HD 120 MO from *Borealis*, were blended with 240 g of the antistatic polymer blend described in example 6 and injection-molded as dry blend, i.e. as mixture of pellets, under the above-described conditions to give 110×100×2 mm test specimens, conditioned and tested. The measured values are shown in table 3.

Example 16: Production of a Polypropylene Compound with Antistatic TPU as Per Example 7 (Batch 2 According to the Invention)

1360 g of polypropylene, HD 120 MO from *Borealis* were blended with 240 g of the antistatic TPU described in example 7 and injection-molded as dry blend, i.e. as mixture of pellets, under the above-described conditions to give 110×100×2 mm test specimens, conditioned and tested. The measured values are shown in table 3.

Example 17: Production of a Polypropylene Compound with Antistatic TPU as Per Example 8 (Batch 3 According to the Invention)

1360 g of polypropylene, HD 120 MO from *Borealis* were blended with 240 g of the antistatic TPU described in example 8 and injection-molded as dry blend, i.e. as mixture of pellets, under the above-described conditions to give 110×100×2 mm test specimens, conditioned and tested. The measured values are shown in table 3.

Example 18: Production of a Polypropylene Compound with Antistatic TPU as Per Example 9 (Batch 4 According to the Invention)

1360 g of polypropylene, HD 120 MO from *Borealis* were blended with 240 g of the antistatic TPU described in example 9 and injection-molded as dry blend, i.e. as mixture of pellets, under the above-described conditions to give 110×100×2 mm test specimens, conditioned and tested. The measured values are shown in table 3.

TABLE 3

Overview of the mechanical and electrical properties and the compatibility of the antistatic TPU or the polymer blend from table 1 in polypropylene (HD 120 MO, from Borealis)

| | | | Example 10 Result | Example 11 Comparison 2 Result | Example 12 Comparison 3 Result | Example 13 Batch 1 according to the invention Result | Example 14 Comparison 4 Result | Example 15 Comparison 5 Result | Example 16 Batch 2 according to the invention Result | Example 17 Batch 3 according to the invention Result | Example 18 Batch 4 according to the invention Result |
|---|---|---|---|---|---|---|---|---|---|---|---|
| Testing | Standard | Unit | | | | TPU formulation | | | | | |
| Mechanics | | | | | | | | | | | |
| Density | DIN EN ISO 1183-1A | g/cm³ | 0.904 | 0.92 | 0.928 | 0.924 | 0.934 | 0.93 | 0.931 | 0.926 | 0.926 |
| Shore hardness D | ISO 7619, Part 1 | | 75 | 71 | 68 | 68 | 65 | 72 | 72 | 70 | 69 |
| Tensile strength | DIN 53504 | MPas | 38 | 33 | 32 | 33 | 31 | 37 | 35 | 34 | 33 |
| Elongation at break | | % | 20 | 20 | 10 | 10 | 20 | 10 | 220 | 460 | 470 |
| Tear propagation resistance | DIN ISO 34-1, B (b | kN/m | 159 | 222 | 157 | 238 | 189 | 198 | 199 | 183 | 216 |

TABLE 3-continued

Overview of the mechanical and electrical properties and the compatibility of the antistatic
TPU or the polymer blend from table 1 in polypropylene (HD 120 MO, from Borealis)

| | | | | Continuing designation | | | | | | | |
|---|---|---|---|---|---|---|---|---|---|---|---|
| | | | | Example 11 | Example 12 | Example 13 | Example 14 | Example 15 | Example 16 | Example 17 | Example 18 |
| | | | | | | | TPU formulation | | | | |
| Testing | Standard | Unit | Example 10 Result | Comparison 2 Result | Comparison 3 Result | Batch 1 according to the invention Result | Comparison 4 Result | Comparison 5 Result | Batch 2 according to the invention Result | Batch 3 according to the invention Result | Batch 4 according to the invention Result |
| Further mechanics | | | | | | | | | | | |
| Charpy impact toughness 23° C. | DIN EN ISO 179-1/1eU | kJ/m$^2$ | 121 | 124 | 26.2 | | | 108 | 57.8 | 65.9 | 65.6 |
| Fracture | | | yes | yes | yes | no | no | yes | yes | yes | yes |
| Charpy impact toughness −30° C. | DIN EN ISO 179-1/1eU | kJ/m$^2$ | 18.3 | 21.3 | 11.9 | 22.7 | 21.7 | 20 | 17.7 | 21.5 | 22.4 |
| Fracture | | | yes | yes | yes | yes | yes | yes | yes | yes | yes |
| Charpy notched impact toughness 23° C. | DIN EN ISO 179-1/1eA | kJ/m$^2$ | 3.2 | 4.3 | 4.6 | 5.1 | 4.7 | 4 | 4.4 | 5.5 | 5.9 |
| Fracture | | | yes | yes | yes | yes | yes | yes | yes | yes | yes |
| Charpy notched impact toughness −30° C. | DIN EN ISO 179-1/1eA | kJ/m$^2$ | 2.8 | 2.9 | 2.8 | 2.9 | 2.7 | 2.9 | 2.9 | 3.2 | 4.1 |
| Fracture | | | yes | yes | yes | yes | yes | yes | yes | yes | yes |
| Electrical properties | | | | | | | | | | | |
| Spec. volume resistance | DIN IEC 60093 | ohm * cm | R maxi | 2.30E+13 | 8.80E+10 | 6.30E+10 | 4.40E+11 | 2.50E+10 | 9.20E+11 | 3.90E+10 | 2.50E+10 |
| Spec. surface resistance with CE | DIN IEC 60093 | ohm | 1.50E+16 | 7.80E+13 | 1.40E+11 | 2.00E+11 | 1.30E+12 | 1.80E+12 | 2.40E+10 | 1.30E+11 | 2.80E+09 |
| Spec. surface resistance without CE | DIN IEC 60093 | ohm | 2.10E+14 | 3.40E+13 | 8.20E+11 | 9.80E+10 | 4.50E+11 | 1.20E+11 | 6.00E+10 | 3.20E+11 | 3.20E+09 |
| Evaluation/ assessment: | | | | | | | | | | | |
| Appearance of the injection-molded plate | | | + | − | ○ | + | − | + | + | + | + |
| Fracture behavior along the injection direction | | | − | − | − | − | − | − | − | − | + |
| Fracture behavior transverse to the injection direction | | | + | ○ | ○ | + | ○ | ○ | + | + | + |

Examples 19 to 27: Production and Assessment of Antistatic Polystyrene Compounds Example 19: Production of the Reference Sample Based on a Pure Polystyrene 1600 g of polystyrene, Styron 485 from Styron, were injection-molded under the above-described conditions to give 110×100×2 mm test specimens, conditioned and tested. The measured values are shown in table 4.

Example 20: Production of an Antistatic Polystyrene Compound with TPU as Per Example 2 (Comparison 2)

1360 g of polystyrene, Styron 485 from Styron, were blended with 240 g of the TPU described in example 2 and injection-molded as dry blend, i.e. as mixture of pellets, under the above-described conditions to give 110×100×2 mm test specimens, conditioned and tested. The measured results are shown in table 4.

Example 21: Production of an Antistatic Polystyrene Compound with TPU as Per Example 3 (Comparison 3)

1360 g of polystyrene, Styron 485 from Styron, were blended with 240 g of the TPU described in example 3 and injection-molded as dry blend, i.e. as mixture of pellets, under the above-described conditions to give 110×100×2 mm test specimens, conditioned and tested. The measured results are shown in table 4.

Example 22: Production of an Antistatic Polystyrene Compound with TPU as Per Example 4 (Batch 1 According to the Invention)

1360 g of polystyrene, Styron 485 from Styron, were blended with 240 g of the antistatic TPU described in example 4 and injection-molded as dry blend, i.e. as mixture of pellets, under the above-described conditions to give 110×100×2 mm test specimens, conditioned and tested. The measured results are shown in table 4.

Example 23: Production of an Antistatic Polystyrene Compound with TPU as Per Example 5 (Comparison 4)

1360 g of polystyrene, Styron 485 from Styron, were blended with 240 g of the antistatic TPU described in example 5 and injection-molded as dry blend, i.e. as mixture of pellets, under the above-described conditions to give 110×100×2 mm test specimens, conditioned and tested. The measured results are shown in table 4.

Example 24: Production of an Antistatic Polystyrene Compound with the Polymer Blend as Per Example 6 (Comparison 5)

1360 g of polystyrene, Styron 485 from Styron, were blended with 240 g of the antistatic polymer blend described in example 5 and injection-molded as dry blend, i.e. as mixture of pellets, under the above-described conditions to give 110×100×2 mm test specimens, conditioned and tested. The measured results are shown in table 4.

Example 25: Production of an Antistatic Polystyrene Compound with TPU as Per Example 7 (Batch 2 According to the Invention)

1360 g of polystyrene, Styron 485 from Styron were blended with 240 g of the antistatic TPU described in example 7 and injection-molded as dry blend, i.e. as mixture of pellets, under the above-described conditions to give 110×100×2 mm test specimens, conditioned and tested. The measured valued are shown in table 4.

Example 26: Production of an Antistatic Polystyrene Compound with TPU as Per Example 8 (Batch 3 According to the Invention)

1360 g of polystyrene, Styron 485 from Styron were blended with 240 g of the antistatic TPU described in example 8 and injection-molded as dry blend, i.e. as mixture of pellets, under the above-described conditions to give 110×100×2 mm test specimens, conditioned and tested. The measured valued are shown in table 4.

Example 27: Production of an Antistatic Polystyrene Compound with TPU as Per Example 9 (Batch 4 According to the Invention)

1360 g of polystyrene, Styron 485 from Styron were blended with 240 g of the antistatic TPU described in example 9 and injection-molded as dry blend, i.e. as mixture of pellets, under the above-described conditions to give 110×100×2 mm test specimens, conditioned and tested. The measured valued are shown in table 4.

TABLE 4

Overview of the mechanical and electrical properties and the compatibility of the antistatic TPU or the polymer blend from table 1 in polystyrene (Styron 485, from Styron)

| Testing | Standard | Unit | Example 20 Example 19 Result | Example 21 Comparison 2 Result | Example 22 Comparison 3 Result | Example 23 TPU formulation Batch 1 according to the invention Result | Example 24 Comparison 4 Result | Example 25 Comparison 5 Result | Example 25 Batch 2 according to the invention Result | Example 26 Batch 3 according to the invention Result | Example 27 Batch 4 according to the invention Result |
|---|---|---|---|---|---|---|---|---|---|---|---|
| Mechanics | | | | | | | | | | | |
| Density | DIN EN ISO 1183-1A | g/cm³ | 1.027 | 1.031 | 1.038 | 1.038 | 1.044 | 1.027 | 1.04 | 1.036 | 1.038 |
| Shore hardness D | ISO 7619, Part 1 | | 78 | 71 | 70 | 72 | 67 | 70 | 70 | 71 | 67 |
| Tensile strength | DIN 53504 | MPas | 25 | 23 | 21 | 20 | 17 | 23 | 25 | 26 | 23 |
| Elongation at break | | % | 60 | 30 | 8 | 40 | 5 | 40 | 10 | 20 | 10 |
| Tear propagation resistance | DIN ISO 34-1, B (b | kN/m | 122 | 115 | 76 | 104 | 76 | 106 | 64 | 91 | 69 |
| Further mechanics | | | | | | | | | | | |
| Charpy impact toughness 23° C. | DIN EN ISO 179-1/1eU | kJ/m³ | 171 | 60.8 | 23 | 140 | 47.8 | | 45.1 | 103 | 112 |
| Fracture | | | yes | yes | yes | yes | yes | no | yes | yes | yes |
| Charpy impact toughness −30° C. | DIN EN ISO 179-1/1eU | kJ/m² | 93 | 107 | 31 | 165 | 94.7 | 122 | 46.6 | 108 | 92.6 |
| Fracture | | | yes | yes | yes | yes | yes | yes | yes | yes | yes |
| Charpy notched impact toughness 23° C. | DIN EN ISO 179-1/1eA | kJ/m² | 9.5 | 9.1 | 5.5 | 10.4 | 10.1 | 9.7 | 8.4 | 11.6 | 11.3 |

TABLE 4-continued

Overview of the mechanical and electrical properties and the compatibility of the antistatic
TPU or the polymer blend from table 1 in polystyrene (Styron 485, from Styron)

| | | | Continuing designation | | | | | | | |
|---|---|---|---|---|---|---|---|---|---|---|
| | | | Example 19 | Example 20 | Example 21 | Example 22 | Example 23 | Example 24 | Example 25 | Example 26 | Example 27 |
| | | | | | | TPU formulation | | | | | |
| Testing | Standard | Unit | Example 19 Result | Comparison 2 Result | Comparison 3 Result | Batch 1 according to the invention Result | Comparison 4 Result | Comparison 5 Result | Batch 2 according to the invention Result | Batch 3 according to the invention Result | Batch 4 according to the invention Result |
| Fracture | | | yes | yes | yes | yes | yes | yes | yes | yes | yes |
| Charpy notched impact toughness −30° C. | DIN EN ISO 179-1/1eA | kJ/m² | 5.2 | 5.6 | 2.9 | 5.4 | 5 | 3.2 | 4.1 | 8.2 | 6.5 |
| Fracture | | | yes | yes | yes | yes | yes | yes | yes | yes | yes |
| Electrical properties | | | | | | | | | | | |
| Spec. volume resistance | DIN IEC 60093 | ohm * cm | R maxi | 7.00E+12 | 3.90E+09 | 1.00E+10 | 1.90E+10 | 1.70E+10 | 2.00E+10 | 3.00E+09 | 6.30E+09 |
| Spec. surface resistance with CE | DIN IEC 60093 | ohm | 3.80E+14 | 5.50E+11 | 3.70E+09 | 2.90E+09 | 6.90E+09 | 1.40E+10 | 4.00E+09 | 3.40E+08 | 2.90E+08 |
| Spec. surface resistance without CE | DIN IEC 60093 | ohm | 1.20E+14 | 3.60E+11 | 2.50E+09 | 2.50E+09 | 4.80E+09 | 1.20E+10 | 3.50E+09 | 2.80E+08 | 2.70E+08 |
| Evaluation/ assessment: | | | | | | | | | | | |
| Appearance of the injection-molded plate | | | + | + | + | + | + | − | ○ | + | + | + |
| Fracture behavior | along the injection direction | | − | − | − | − | − | − | − | − | − |
| Fracture behavior | transverse to the injection direction | | + | − | − | + | − | + | − | − | − |

Examples 28 to 36: Production and Assessment of Antistatic Polyethylene Compounds

Example 28: Production of the Reference Sample Based on a Pure Polyethylene 1600 g of polyethylene, Lupolen 4261 AG from Basell, were injection-molded under the above-described conditions to give 110×100×2 mm test specimens, conditioned and tested. The measured results are shown in table 5.

Example 29: Production of an Antistatic Polyethylene Compound with TPU as Per Example 2 (Comparison 2)

1360 of polyethylene, Lupolen 4261 AG from Basell, were blended with 240 g of the antistatic TPU described in example 2 and injection-molded as dry blend, i.e. as mixture of pellets, under the above-described conditions to give 110×100×2 mm test specimens, conditioned and tested. The measured results are shown in table 5.

Example 30: Production of an Antistatic Polyethylene Compound with TPU as Per Example 3 (Comparison 3)

1360 of polyethylene, Lupolen 4261 AG from Basell, were blended with 240 g of the antistatic TPU described in example 3 and injection-molded as dry blend, i.e. as mixture of pellets, under the above-described conditions to give 110×100×2 mm test specimens, conditioned and tested. The measured results are shown in table 5.

Example 31: Production of an Antistatic Polyethylene Compound with TPU as Per Example 4 (Batch 1 According to the Invention)

1360 of polyethylene, Lupolen 4261 AG from Basell, were blended with 240 g of the antistatic TPU described in example 4 and injection-molded as dry blend, i.e. as mixture of pellets, under the above-described conditions to give 110×100×2 mm test specimens, conditioned and tested. The measured results are shown in table 5.

Example 32: Production of an Antistatic Polyethylene Compound with TPU as Per Example 5 (Comparison 4)

1360 of polyethylene, Lupolen 4261 AG from Basell, were blended with 240 g of the antistatic TPU described in example 5 and injection-molded as dry blend, i.e. as mixture of pellets, under the above-described conditions to give 110×100×2 mm test specimens, conditioned and tested. The measured results are shown in table 5.

Example 33: Production of an Antistatic Polyethylene Compound with the Polymer Blend as Per Example 6 (Comparison 5)

1360 of polyethylene, Lupolen 4261 AG from Basell, were blended with 240 g of the antistatic polymer blend described in example 6 and injection-molded as dry blend, i.e. as mixture of pellets, under the above-described conditions to give 110×100×2 mm test specimens, conditioned and tested. The measured results are shown in table 5.

Example 34: Production of an Antistatic Polyethylene Compound with TPU as Per Example 7 (Batch 2 According to the Invention)

1360 of polyethylene, Lupolen 4261 AG from Basell were blended with 240 g of the antistatic TPU described in example 7 and injection-molded as dry blend, i.e. as mixture of pellets, under the above-described conditions to give 110×100×2 mm test specimens, conditioned and tested. The measured values are shown in table 5.

Example 35: Production of an Antistatic Polyethylene Compound with TPU as Per Example 8 (Batch 3 According to the Invention)

1360 of polyethylene, Lupolen 4261 AG from Basell were blended with 240 g of the antistatic TPU described in example 8 and injection-molded as dry blend, i.e. as mixture of pellets, under the above-described conditions to give 110×100×2 mm test specimens, conditioned and tested. The measured values are shown in table 5.

Example 36: Production of an Antistatic Polyethylene Compound with TPU as Per Example 9 (Batch 3 According to the Invention)

1360 of polyethylene, Lupolen 4261 AG from Basell were blended with 240 g of the antistatic TPU described in example 9 and injection-molded as dry blend, i.e. as mixture of pellets, under the above-described conditions to give 110×100×2 mm test specimens, conditioned and tested. The measured values are shown in table 5.

TABLE 5

Overview of the mechanical and electrical properties and the compatibility of the antistatic TPU or the polymer blend from table 1 in polyethylene (Lupolen 4261 AG, from Basell)

| | | | Example 28 | Example 29 | Example 30 | Example 31 | Example 32 | Example 33 | Example 34 | Example 35 | Example 36 |
|---|---|---|---|---|---|---|---|---|---|---|---|
| | | | | | | | TPU formulation | | | | |
| Testing | Standard | Unit | Result | Comparison 2 Result | Comparison 3 Result | Batch 1 according to the invention Result | Comparison 4 Result | Comparison 5 Result | Batch 2 according to the invention Result | Batch 3 according to the invention Result | Batch 4 according to the invention Result |
| Mechanics | | | | | | | | | | | |
| Density | DIN EN ISO 1183-1A | g/cm$^3$ | 0.94 | 0.951 | 0.96 | 0.964 | 0.96 | 0.953 | 0.961 | 0.958 | 0.959 |
| Shore hardness D | ISO 7619, Part 1 | | 66 | 61 | 56 | 59 | 60 | 64 | 61 | 61 | 59 |
| Tensile strength | DIN 53504 | MPas | 45 | 29 | 15 | 31 | 31 | 42 | 30 | 27 | 23 |
| Elongation at break | | % | 10 | 8 | 8 | 10 | 10 | 9 | 80 | 140 | 70 |
| Tear propagation resistance | DIN ISO 34-1, B (b | kN/m | 186 | 108 | 82 | 95 | 110 | 110 | 105 | 134 | 115 |
| Further mechanics | | | | | | | | | | | |
| Charpy impact toughness 23° C. | DIN EN ISO 179-1/1eU | kJ/m$^2$ | | | | | | | | | |
| Fracture | | | no | no | no | no | no | no | no | no | no |
| Charpy impact toughness −30° C. | DIN EN ISO 179-1/1eU | kJ/m$^2$ | | | 20.2 | | | | 119 | 98.8 | |
| Fracture | | | no | no | yes | no | no | yes | yes | no | no |
| Charpy notched impact toughness 23° C. | DIN EN ISO 179-1/1eA | kJ/m$^2$ | | 69.2 | 61.8 | | | 30.3 | 59.3 | 71.9 | 73.8 |
| Fracture | | | no | yes | yes | no | no | yes | yes | yes | yes |
| Charpy notched impact toughness −30° C. | DIN EN ISO 179-1/1eA | kJ/m$^2$ | 54.6 | 18.6 | 10.6 | | 23.7 | 10.6 | 24.8 | 27.7 | 66.8 |
| Fracture | | | yes | yes | yes | no | yes | yes | yes | yes | yes |
| Electrical properties | | | | | | | | | | | |
| Spec. volume resistance | DIN IEC 60093 | ohm * cm | R maxi | 3.40E+12 | 1.50E+09 | 5.20E+08 | 4.20E+10 | 6.90E+10 | 2.40E+10 | 2.60E+09 | 9.30E+10 |
| Spec. surface resistance with CE | DIN IEC 60093 | ohm | 1.20E+16 | 4.20E+11 | 2.80E+08 | 2.70E+09 | 1.50E+10 | 2.60E+09 | 5.40E+09 | 8.30E+08 | 3.20E+08 |

TABLE 5-continued

Overview of the mechanical and electrical properties and the compatibility of the antistatic TPU or the polymer blend from table 1 in polyethylene (Lupolen 4261 AG, from Basell)

| | | | Continuing designation | | | | | | | |
|---|---|---|---|---|---|---|---|---|---|---|
| | | | Example 28 Result | Example 29 Com- parison 2 Result | Example 30 Com- parison 3 Result | Example 31 Batch 1 according to the invention Result | Example 32 Com- parison 4 Result | Example 33 Com- parison 5 Result | Example 34 Batch 2 according to the invention Result | Example 35 Batch 3 according to the invention Result | Example 36 Batch 4 according to the invention Result |
| Testing | Standard | Unit | | | | TPU formulation | | | | | |
| Spec. surface resistance without CE Evaluation/ assessment: | DIN IEC 60093 | ohm | 4.70E+14 | 4.50E+11 | 2.60E+08 | 2.30E+09 | 1.20E+10 | 2.60E+09 | 5.70E+09 | 7.30E+08 | 4.10E+08 |
| Appearance of the injection-molded plate | | | + | ○ | ○ | + | ○ | + | + | + | + |
| Fracture behavior | along the injection direction | | + | ○ | ○ | − | − | − | ○ | ○ | ○ |
| Fracture behavior | transverse to the injection direction | | + | − | ○ | + | ○ | + | ○ | ○ | ○ |

Examples 37 to 45: Production and Assessment of Antistatic Polyoxymethylene Compounds Example 37: Production of the Reference Sample Based on a Pure Polyoxymethylene 1600 g of polyoxymethylene, POM for short, here an Ultraform N 2320 from BASF, were injection-molded under the above-described conditions to give 110×100×2 mm test specimens, conditioned and tested. The measured values are shown in table 6.

Example 38: Production of an Antistatic Polyoxymethylene Compound with TPU as Per Example 2 (Comparison 2)

1360 g of polyoxymethylene, Ultraform N 2320 from BASF, were blended with 240 g of the antistatic TPU described in example 2 and injection-molded as dry blend, i.e. as mixture of pellets, under the above-described conditions to give 110×100×2 mm test specimens, conditioned and tested. The measured values are shown in table 6.

Example 39: Production of an Antistatic Polyoxymethylene Compound with TPU as Per Example 3 (Comparison 3)

1360 g of polyoxymethylene, Ultraform N 2320 from BASF, were blended with 240 g of the antistatic TPU described in example 3 and injection-molded as dry blend, i.e. as mixture of pellets, under the above-described conditions to give 110×100×2 mm test specimens, conditioned and tested. The measured values are shown in table 6.

Example 40: Production of an Antistatic Polyoxymethylene Compound with TPU as Per Example 4 (Batch 1 According to the Invention)

1360 g of polyoxymethylene, Ultraform N 2320 from BASF, were blended with 240 g of the antistatic TPU described in example 4 and injection-molded as dry blend, i.e. as mixture of pellets, under the above-described conditions to give 110×100×2 mm test specimens, conditioned and tested. The measured values are shown in table 6.

Example 41: Production of an Antistatic Polyoxymethylene Compound with TPU as Per Example 5 (Comparison 4)

1360 g of polyoxymethylene, Ultraform N 2320 from BASF, were blended with 240 g of the antistatic TPU described in example 5 and injection-molded as dry blend, i.e. as mixture of pellets, under the above-described conditions to give 110×100×2 mm test specimens, conditioned and tested. The measured values are shown in table 6.

Example 42: Production of an Antistatic Polyoxymethylene Compound with the Polymer Blend as Per Example 6 (Comparison 5)

1360 g of polyoxymethylene, Ultraform N 2320 from BASF, were blended with 240 g of the antistatic polymer blend described in example 6 and injection-molded as dry blend, i.e. as mixture of pellets, under the above-described conditions to give 110×100×2 mm test specimens, conditioned and tested. The measured values are shown in table 6.

Example 43: Production of an Antistatic Polyoxymethylene Compound with TPU as Per Example 7 (Batch 2 According to the Invention)

1360 g of polyoxymethylene, Ultraform N 2320 from BASF were blended with 240 g of the antistatic TPU described in example 7 and injection-molded as dry blend, i.e. as mixture of pellets, under the above-described conditions to give 110×100×2 mm test specimens, conditioned and tested. The measured values are shown in table 6.

Example 44: Production of an Antistatic Polyoxymethylene Compound with TPU as Per Example 8 (Batch 3 According to the Invention)

1360 g of polyoxymethylene, Ultraform N 2320 from BASF were blended with 240 g of the antistatic TPU described in example 8 and injection-molded as dry blend, i.e. as mixture of pellets, under the above-described conditions to give 110×100×2 mm test specimens, conditioned and tested. The measured values are shown in table 6.

Example 45: Production of an Antistatic Polyoxymethylene Compound with TPU as Per Example 9 (Batch 4 According to the Invention)

1360 g of polyoxymethylene, Ultraform N 2320 from BASF were blended with 240 g of the antistatic TPU described in example 9 and injection-molded as dry blend, i.e. as mixture of pellets, under the above-described conditions to give 110×100×2 mm test specimens, conditioned and tested. The measured values are shown in table 6.

TABLE 6

Overview of the mechanical and electrical properties and the compatibility of the antistatic TPU or the polymer blend from table 1 in polyoxymethylene (Ultraform N 2320, from BASF)

| | | | Continuing designation | | | | |
|---|---|---|---|---|---|---|---|
| | | | Example 37 | Example 38 | Example 39 | Example 40 | Example 41 |
| | | | | TPU formulation | | | |
| Testing | Standard | Unit | Example 37 Result | Comparison 2 Result | Comparison 3 Result | Batch 1 according to the invention Result | Comparison 4 Result |
| Mechanics | | | | | | | |
| Density | DIN EN ISO 1183-1A | g/cm$^3$ | 1.399 | 1.328 | 1.36 | 1.342 | 1.36 |
| Shore hardness D | ISO 7619, Part 1 | | 81 | 72 | 76 | 75 | 76 |
| Tensile strength | DIN 53504 | MPas | 62 | 39 | 51 | 47 | 44 |
| Elongation at break | | % | 40 | 30 | 50 | 70 | 20 |
| Tear propagation resistance | DIN ISO 34-1, B (b | kN/m | 128 | 175 | 213 | 217 | 197 |
| Further mechanics | | | | | | | |
| Charpy impact toughness 23° C. | DIN EN ISO 179-1/1eU | kJ/m$^2$ | 217 | | | 88.3 | 66.1 |
| Fracture | | | yes | no | no | yes | yes |
| Charpy impact toughness −30° C. | DIN EN ISO 179-1/1eU | kJ/m$^2$ | 154 | 211 | 169 | 145 | 31.6 |
| Fracture | | | yes | yes | yes | yes | yes |
| Charpy notched impact toughness 23° C. | DIN EN ISO 179-1/1eA | kJ/m$^2$ | 5.5 | 6.8 | 8.1 | 7.7 | 6 |
| Fracture | | | yes | yes | yes | yes | yes |
| Charpy notched impact toughness −30° C. | DIN EN ISO 179-1/1eA | kJ/m$^2$ | 5.5 | 5.9 | 5.4 | 6.5 | 3.9 |
| Fracture | | | yes | yes | yes | yes | yes |
| Electrical properties | | | | | | | |
| Spec. volume resistance | DIN IEC 60093 | ohm * cm | 1.20E+14 | 2.30E+12 | 1.20E+10 | 3.70E+09 | 1.60E+11 |
| Spec. surface resistance with CE | DIN IEC 60093 | ohm | 1.10E+15 | 1.80E+12 | 1.90E+09 | 9.10E+09 | 2.40E+10 |
| Spec. surface resistance without CE | DIN IEC 60093 | ohm | 1.00E+14 | 1.20E+12 | 1.60E+09 | 8.00E+09 | 2.10E+10 |
| Evaluation/ assessment: | | | | | | | |
| Appearance of the injection-molded plate | | | + | ○ | ○ | ○ | − |
| Fracture behavior | along the injection direction | | + | − | ○ | + | − |
| Fracture behavior | transverse to the injection direction | | + | + | + | + | ○ |

TABLE 6-continued

Overview of the mechanical and electrical properties and the compatibility of the antistatic
TPU or the polymer blend from table 1 in polyoxymethylene (Ultraform N 2320, from BASF)

| | | | Continuing designation | | | |
|---|---|---|---|---|---|---|
| | | | Example 42 | Example 43 | Example 44 | Example 45 |
| | | | TPU formulation | | | |
| Testing | Standard | Unit | Comparison 5 Result | Batch 2 according to the invention Result | Batch 3 according to the invention Result | Batch 4 according to the invention Result |
| Mechanics | | | | | | |
| Density | DIN EN ISO 1183-1A | g/cm$^3$ | 1.342 | 1.365 | 1.353 | 1.355 |
| Shore hardness D | ISO 7619, Part 1 | | 78 | 77 | 76 | 75 |
| Tensile strength | DIN 53504 | MPas | 53 | 53 | 47 | 48 |
| Elongation at break | | % | 30 | 30 | 70 | 70 |
| Tear propagation resistance | DIN ISO 34-1, B (b | kN/m | 148 | 88 | 170 | 153 |
| Further mechanics | | | | | | |
| Charpy impact toughness 23° C. | DIN EN ISO 179-1/1eU | kJ/m$^2$ | | 134 | | |
| Fracture | | | no | yes | no | no |
| Charpy impact toughness −30° C. | DIN EN ISO 179-1/1eU | kJ/m$^2$ | 198 | 53.2 | 232 | 205 |
| Fracture | | | yes | yes | yes | yes |
| Charpy notched impact toughness 23° C. | DIN EN ISO 179-1/1eA | kJ/m$^2$ | 6 | 8.5 | 11.3 | 12.8 |
| Fracture | | | yes | yes | yes | yes |
| Charpy notched impact toughness −30° C. | DIN EN ISO 179-1/1eA | kJ/m$^2$ | 5.2 | 5.6 | 10 | 10.4 |
| Fracture | | | yes | yes | yes | yes |
| Electrical properties | | | | | | |
| Spec. volume resistance | DIN IEC 60093 | ohm * cm | 1.20E+10 | 7.70E+10 | 2.00E+10 | 1.40E+10 |
| Spec. surface resistance with CE | DIN IEC 60093 | ohm | 6.10E+09 | 9.00E+09 | 1.90E+09 | 1.50E+09 |
| Spec. surface resistance without CE | DIN IEC 60093 | ohm | 3.20E+09 | 7.80E+09 | 1.80E+09 | 1.10E+09 |
| Evaluation/ assessment: | | | | | | |
| Appearance of the injection-molded plate | | | ◯ | ◯ | ◯ | ◯ |
| Fracture behavior | along the injection direction | | − | − | + | + |
| Fracture behavior | transverse to the injection direction | | + | + | + | + |

Examples 46 to 54: Production and Assessment of Antistatic Polyoxymethylene Compounds

Example 46: Production of the Reference Specimen Based on Pure Polyvinyl Chloride 1600 g of polyvinyl chloride, PVC for short, here a plasticized PVC from Nicocyl GmbH were injection-molded under the above-described conditions to give 110×100×2 mm test specimens, conditioned and tested. The measured values are shown in table 7.

Example 47: Production of an Antistatic Polyvinyl Chloride Compound with TPU as Per Example 2 (Comparison 2)

1360 g of polyvinyl chloride, PVC for short, here a plasticized PVC from Nicocyl GmbH, were blended with 240 g of the antistatic TPU described in example 2 and injection-molded as dry blend, i.e. as mixture of pellets, under the above-described conditions to give 110×100×2 mm test specimens, conditioned and tested. The measured values are shown in table 7.

Example 48: Production of an Antistatic Polyvinyl Chloride Compound with TPU as Per Example 3 (Comparison 3)

1360 g of polyvinyl chloride, PVC for short, here a plasticized PVC from Nicocyl GmbH, were blended with 240 g of the antistatic TPU described in example 3 and injection-molded as dry blend, i.e. as mixture of pellets, under the above-described conditions to give 110×100×2 mm test specimens, conditioned and tested. The measured values are shown in table 7.

Example 49: Production of an Antistatic Polyvinyl Chloride Compound with TPU as Per Example 4 (Batch 1 According to the Invention)

1360 g of polyvinyl chloride, PVC for short, here a plasticized PVC from Nicocyl GmbH, were blended with 240 g of the antistatic TPU described in example 4 and injection-molded as dry blend, i.e. as mixture of pellets, under the above-described conditions to give 110×100×2 mm test specimens, conditioned and tested. The measured values are shown in table 7.

Example 50: Production of an Antistatic Polyvinyl Chloride Compound with TPU as Per Example 5 (Comparison 4)

1360 g of polyvinyl chloride, PVC for short, here a plasticized PVC from Nicocyl GmbH, were blended with 240 g of the antistatic TPU described in example 5 and injection-molded as dry blend, i.e. as mixture of pellets, under the above-described conditions to give 110×100×2 mm test specimens, conditioned and tested. The measured values are shown in table 7.

Example 51: Production of an Antistatic Polyvinyl Chloride Compound with TPU as Per Example 6 (Comparison 5)

1360 g of polyvinyl chloride, PVC for short, here a plasticized PVC from Nicocyl GmbH, were blended with 240 g of the antistatic TPU described in example 6 and injection-molded as dry blend, i.e. as mixture of pellets, under the above-described conditions to give 110×100×2 mm test specimens, conditioned and tested. The measured values are shown in table 7.

Example 52: Production of an Antistatic Polyvinyl Chloride Compound with TPU as Per Example 7 (Batch 2 According to the Invention)

1360 g of polyvinyl chloride, PVC for short, here a plasticized PVC from Nicocyl GmbH, were blended with 240 g of the antistatic TPU described in example 7 and injection-molded as dry blend, i.e. as mixture of pellets, under the above-described conditions to give 110×100×2 mm test specimens, conditioned and tested. The measured values are shown in table 7.

Example 53: Production of an Antistatic Polyvinyl Chloride Compound with TPU as Per Example 8 (Batch 3 According to the Invention)

1360 g of polyvinyl chloride, PVC for short, here a plasticized PVC from Nicocyl GmbH, were blended with 240 g of the antistatic TPU described in example 8 and injection-molded as dry blend, i.e. as mixture of pellets, under the above-described conditions to give 110×100×2 mm test specimens, conditioned and tested. The measured values are shown in table 7.

Example 54: Production of an Antistatic Polyvinyl Chloride Compound with TPU as Per Example 9 (Batch 4 According to the Invention)

1360 g of polyvinyl chloride, PVC for short, here a plasticized PVC from Nicocyl GmbH, were blended with 240 g of the antistatic TPU described in example 9 and injection-molded as dry blend, i.e. as mixture of pellets, under the above-described conditions to give 110×100×2 mm test specimens, conditioned and tested. The measured values are shown in table 7.

TABLE 7

Overview of the mechanical and electrical properties and the compatibility of the antistatic TPU or the polymer blend from tab.1 in polyvinyl chloride (plasticized PVC, from Nicocyl GmbH)

| | | | | Continuing designation | | | |
|---|---|---|---|---|---|---|---|
| | | | | Example 47 | Example 48 | Example 49 | Example 50 |
| | | | | TPU formulation | | | |
| Testing | Standard | Unit | Example 46 Result | Comparison 2 Result | Comparison 3 Result | Batch 1 according to the invention Result | Comparison 4 Result |
| Mechanics | | | | | | | |
| Density | DIN EN ISO 1183-1A | g/cm³ | 1.512 | 1.436 | 1.453 | 1.446 | 1.455 |
| Shore hardness D | ISO 7619, Part 1 | | 57 | 50 | 48 | 46 | 46 |
| Tensile strength | DIN 53504 | MPas | 18 | 13 | 13 | 11 | 11 |
| Elongation at break | | % | 130 | 110 | 80 | 70 | 90 |
| Tear propagation resistance | DIN ISO 34-1, B (b | kN/m | 81 | 54 | 55 | 40 | 49 |
| Further mechanics | | | | | | | |
| Charpy impact toughness 23° C. | DIN EN ISO 179-1/1eU | kJ/m² | | | | | |

TABLE 7-continued

Overview of the mechanical and electrical properties and the compatibility of the antistatic
TPU or the polymer blend from tab.1 in polyvinyl chloride (plasticized PVC, from Nicocyl GmbH)

| | | | | | | | |
|---|---|---|---|---|---|---|---|
| Fracture | | | no | no | no | no | no |
| Charpy impact toughness −30° C. | DIN EN ISO 179-1/1eU | kJ/m$^2$ | 43 | 58 | 36 | 60 | 58 |
| Fracture | | | yes | yes | yes | yes | yes |
| Charpy notched impact toughness 23° C. | DIN EN ISO 179-1/1eA | kJ/m$^2$ | 62 | 16 | 37 | 38 | 60 |
| Fracture | | | yes | yes | yes | yes | yes |
| Charpy notched impact toughness −30° C. | DIN EN ISO 179-1/1eA | kJ/m$^2$ | 3.4 | 4 | 3.8 | 4 | 3.8 |
| Fracture | | | yes | yes | yes | yes | yes |
| Electrical properties | | | | | | | |
| Spec. volume resistance | DIN IEC 60093 | ohm * cm | 2.80E+14 | 1.30E+10 | 2.40E+08 | 1.20E+08 | 3.70E+08 |
| Spec. surface resistance with CE | DIN IEC 60093 | ohm | 1.30E+14 | 6.90E+10 | 8.80E+07 | 4.00E+08 | 5.80E+08 |
| Spec. surface resistance without CE | DIN IEC 60093 | ohm | 3.60E+13 | 1.60E+10 | 7.90E+07 | 1.60E+08 | 3.60E+08 |
| Evaluation/assessment: | | | | | | | |
| Appearance of the injection-molded plate | | | + | + | + | + | + |
| Fracture behavior | along the injection direction | | + | + | + | + | + |
| Fracture behavior | transverse to the injection direction | | + | + | + | + | + |

| | | | Continuing designation | | | |
|---|---|---|---|---|---|---|
| | | | Example 51 | Example 52 | Example 53 | Example 54 |
| | | | TPU formulation | | | |
| Testing | Standard | Unit | Comparison 5 Result | Batch 2 according to the invention Result | Batch 3 according to the invention Result | Batch 4 according to the invention Result |
| Mechanics | | | | | | |
| Density | DIN EN ISO 1183-1A | g/cm$^3$ | 1.433 | 1.453 | 1.441 | 1.444 |
| Shore hardness D | ISO 7619, Part 1 | | 57 | 55 | 44 | 48 |
| Tensile strength | DIN 53504 | MPas | 17 | 17 | 12 | 13 |
| Elongation at break | | % | 130 | 110 | 80 | 110 |
| Tear propagation resistance | DIN ISO 34-1, B (b | kN/m | 81 | 79 | 45 | 59 |
| Further mechanics | | | | | | |
| Charpy impact toughness 23° C. | DIN EN ISO 179-1/1eU | kJ/m$^2$ | | | | |
| Fracture | | | no | no | no | no |
| Charpy impact toughness −30° C. | DIN EN ISO 179-1/1eU | kJ/m$^2$ | 41 | 30 | 56 | 70 |
| Fracture | | | yes | yes | yes | yes |
| Charpy notched impact toughness 23° C. | DIN EN ISO 179-1/1eA | kJ/m$^2$ | 69 | 63 | 57 | 31 |
| Fracture | | | yes | yes | yes | yes |
| Charpy notched impact toughness −30° C. | DIN EN ISO 179-1/1eA | kJ/m$^2$ | 3.8 | 3.7 | 3.9 | 4.2 |
| Fracture | | | yes | yes | yes | yes |
| Electrical properties | | | | | | |
| Spec. volume resistance | DIN IEC 60093 | ohm * cm | 1.90E+10 | 8.60E+08 | 2.10E+08 | 1.10E+08 |
| Spec. surface resistance with CE | DIN IEC 60093 | ohm | 1.10E+10 | 1.50E+09 | 4.60E+08 | 4.60E+08 |

TABLE 7-continued

Overview of the mechanical and electrical properties and the compatibility of the antistatic
TPU or the polymer blend from tab.1 in polyvinyl chloride (plasticized PVC, from Nicocyl GmbH)

| | | | | | | |
|---|---|---|---|---|---|---|
| Spec. surface resistance without CE Evaluation/ assessment: | DIN IEC 60093 | ohm | 1.00E+10 | 7.90E+08 | 2.80E+08 | 2.40E+08 |
| Appearance of the injection-molded plate | | | + | + | + | + |
| Fracture behavior | along the injection direction | | + | + | ○ | + |
| Fracture behavior | transverse to the injection direction | | + | + | + | + |

The invention claimed is:

1. A composition comprising:
    a thermoplastic polyurethane; and
    a salt and/or an ionic liquid;
    wherein
    the composition is a solid material, and
    the thermoplastic polyurethane comprises as copolymerized components:
    an aliphatic and/or cycloaliphatic diisocyanate,
    a mixture of a polyol A which comprises ethoxy and propoxy groups, and
    a polyol B which is a polytetramethylene glycol, and
    an alkanediol chain extender.

2. The composition according to claim 1, wherein a molar % of the ethoxy and propoxy groups in the polyol A is at least 5 mol % of the total of polyol A and a molar % of polytetramethylene glycol groups in the polyol B is at least 5 mol %, based on the total of polyol B.

3. The composition according to claim 1, wherein a proportion of the ethoxy groups in the polyol A is at least 25 mol %, based on the total of polyol A.

4. The composition according to claim 1, wherein the polyol B is a homopolymer.

5. The composition according to claim 1, wherein the polyol A is a block copolymer having a block and two ends, and the block comprises ethoxy and propoxy groups and the two ends of the block copolymer consist of ethoxy groups.

6. The composition according to claim 5, wherein a proportion of the ethoxy groups in the two ends of the block copolymer is more than 5 mol %, based on the total block copolymer.

7. The composition according to claim 1, wherein an amount of the salt or the ionic liquid is from 0.1% by weight to 25% by weight, based on the weight of the thermoplastic polyurethane.

8. The composition according to claim 1, wherein the chain extender is 1,3-propanediol and 1,4-butanediol, or 1,3-propanediol and 1,6-hexanediol, or 1,4-butanediol and 1,6-hexanediol, or 1,6-hexanediol.

9. The composition according to claim 1, wherein the diisocyanate is an aliphatic diisocyanate.

10. A mixture comprising a polymer and a composition according to claim 1.

11. The mixture according to claim 10, wherein the polymer is at least one selected from the group consisting of polyethylene, polypropylene, polystyrene, polyoxymethylene, ethylene-vinyl acetate, acrylonitrile-butadiene-styrene, polyvinyl chloride, and a thermoplastic polyurethane different from that of the composition.

12. The mixture according to claim 10, wherein a proportion by weight of the composition in the mixture is from greater than 1% by weight to less than 50% by weight.

13. A method to reduce static charging of a polymer, comprising:
    increasing the conductivity of the polymer by mixing the composition according to claim 1 with the polymer.

14. A process for producing the composition according to claim 1, comprising:
    preparing the thermoplastic polyurethane, and
    mixing the thermoplastic polyurethane with a salt and/or an ionic liquid.

15. A process for producing the mixture according to claim 10, comprising:
    preparing the thermoplastic polyurethane;
    mixing the thermoplastic polyurethane with a salt and/or an ionic liquid; and
    mixing the thermoplastic polyurethane, salt and/or ionic liquid mixture with a polymer.

16. A thermoplastic polyurethane, comprising as copolymerized components:
    an aliphatic and/or cycloaliphatic diisocyanate,
    a mixture of a polyol A which comprises ethoxy and propoxy groups, and
    a polyol B which comprises polytetramethylene glycol groups, and
    an alkanediol chain extender.

* * * * *

UNITED STATES PATENT AND TRADEMARK OFFICE
CERTIFICATE OF CORRECTION

PATENT NO. : 10,692,624 B2
APPLICATION NO. : 15/029967
DATED : June 23, 2020
INVENTOR(S) : Frank Schaefer et al.

It is certified that error appears in the above-identified patent and that said Letters Patent is hereby corrected as shown below:

On the Title Page

In Column 1, item (73), Assignee, Line 1, delete "Lugwigshafen" and insert -- Ludwigshafen --, therefor.

In the Specification

In Column 4, Lines 22-23, delete "diisocyante" and insert -- diisocyanate --, therefor.

In Column 5, Lines 33-34, delete "monopropanediol (MPG)," and insert -- monopropylene glycol (MPG), --, therefor.

In Column 5, Line 35, delete "dipropanediol (DPG)," and insert -- dipropylene glycol (DPG), --, therefor.

In Column 7, Line 18 (approx.), delete "[Plastat C" and insert -- Plastat C --, therefor.

In Column 8, Line 37 (approx.), delete "Eversorb®82." and insert -- Eversorb® 82. --, therefor.

In Column 10, Line 41 (approx.), delete "(Mn)" and insert -- ($M_n$) --, therefor.

In Column 10, Line 63, delete "(EMI N" and insert -- (EMIN --, therefor.

In Column 11, Line 2, delete "phenylethyl)-" and insert -- phenylethyl) --, therefor.

In Column 11, Line 21, delete "phenyl)ethyl" and insert -- phenylethyl --, therefor.

In Columns 13 and 14, Table 1, Line 10, delete "Mn" and insert -- $M_n$ --, therefor.

In Columns 13 and 14, Table 1, Line 12, delete "Mn" and insert -- $M_n$ --, therefor.

Signed and Sealed this
Fifteenth Day of September, 2020

Andrei Iancu
*Director of the United States Patent and Trademark Office*

In Columns 13 and 14, Table 1, Line 14, delete "Mn" and insert -- $M_n$ --, therefor.

In Columns 13 and 14, Table 1, Line 16, delete "Mn" and insert -- $M_n$ --, therefor.